United States Patent [19]

Weiss

[11] 4,299,376
[45] Nov. 10, 1981

[54] APPARATUS FOR THE SELECTIVE SEPARATION OF NON-FERROMAGNETIC METALS FROM A MIXTURE OF COMMINUTED METALLIC SCRAP

[75] Inventor: Karl Weiss, Altenberg, Fed. Rep. of Germany

[73] Assignee: sma Shredder-Müll Aufbereitung Schrott Maschinen Abbruch GmbH, Nuremberg, Fed. Rep. of Germany

[21] Appl. No.: 101,677

[22] Filed: Dec. 10, 1979

[30] Foreign Application Priority Data

Dec. 21, 1978 [DE] Fed. Rep. of Germany ....... 2855239
Apr. 28, 1979 [DE] Fed. Rep. of Germany ....... 2917316

[51] Int. Cl.³ ............................................ F27B 17/00
[52] U.S. Cl. ................................... 266/205; 266/901; 75/63
[58] Field of Search .................... 266/205; 75/63, 445; 266/900, 901

[56] References Cited

U.S. PATENT DOCUMENTS 3,401,925  9/1968  Evans et al. ......................... 266/205
4,017,306  4/1977  Batoux et al. ........................... 75/63

Primary Examiner—M. J. Andrews
Attorney, Agent, or Firm—Jordan and Hamburg

[57] ABSTRACT

Process and apparatus are provided for the selective separation of non-ferromagnetic metals from a mixture of comminuted metallic scrap of approximately uniform particle size. The process includes the step of continuously introducing the mixture into a fluid bath maintained at a temperature higher than the melting point of a selected metal to be separated from the mixture. Solid mixture constituents remaining after the melting out of the selected metal from the mixture are withdrawn from the bath fluid by means of a screw conveyor. A melt of the selected metal is recovered.

20 Claims, 4 Drawing Figures

APPARATUS FOR THE SELECTIVE SEPARATION OF NON-FERROMAGNETIC METALS FROM A MIXTURE OF COMMINUTED METALLIC SCRAP

BACKGROUND OF THE INVENTION

This invention relates to a process and apparatus for the selective separation of non-ferromagnetic metals from a mixture of comminuted metallic scrap having an approximately uniform particle size. Such a mixture arises during the processing of so-called shredder-scrap. Generally such scrap is comminuted and non-metallic constituents are removed, ferromagnetic constituents being then selectively separated by a magnetic process whereby finally a mixture of non-ferromagnetic particles of relatively uniform size after the removal of additional particles of predetermined sizes.

Heretofore, such mixtures of non-ferromagnetic metals, particularly those consisting of relatively small particles, were of minimal commercial value because their lead content was disproportionately high despite the previous separation steps and also because the separation of various metals contained in the mixture, mainly lead, zinc, aluminum and copper or copper and zinc in the form of brass, could not be achieved economically or because the final materials obtained by these processes did not possess sufficient purity needed for economical use. These mixtures could, however, be used as additives in certain cases. Considering the ever increasing industrialisation and the growing shortage of raw materials the importance of recycling is also greater. It has thus become increasingly necessary and also more profitable to extract pure metals from all kinds of scrap.

Various methods are presently known for extracting certain metals from scrap, particularly scrap consisting of larger particles. Thus, it has been known to melt certain metals out of mixtures by the use of radiant heat, and to selectively apply heat according to the melting points of the metals to be extracted. However, in addition to the fact that poisonous metal oxides could be generated due to reaction with the oxygen of the air, the degree of purity of metals obtained by these controlled heating techniques is extremely unsatisfactory because a portion of the melted metal remains as a coating on the non-molten metal. A similar problem arises with a known process in which the metallic mixture is introduced into a bath having a higher temperature than that of the melting point of the metal to be extracted because here also the efficiency of the process in terms of the quantity of the selected metal extracted from the remaining mixture is unsatisfactory.

Based upon this state of the art it is one object of the invention to provide process and apparatus, which permits the continuous separation of selected non-ferromagnetic metallic constituents from scrap mixtures at a relatively high throughput rates even when the particle size of the mixture is relatively small. The financial costs of the process must be maintained sufficiently low so that the extracted metals can be sold competitively. It is also important that there be minimum adverse effect upon the quality of the environment, a factor which has become more and more important.

SUMMARY OF THE INVENTION

In accordance with the invention there is provided a process for the selective separation of non-ferromagnetic metals from a mixture of comminuted metallic scrap of approximately uniform particle size comprising continuously introducing the mixture into a fluid bath which is maintained at a temperature higher than the melting point of a first metal to be separated from the mixture, withdrawing from the bath solid mixture constituents remaining after the melting out of the first selected metal from the mixture by means of a screw conveyor, and recovering from the bath the melted out metal first selected for separation.

In accordance with the invention there is also provided an apparatus for the selective separation of non-ferromagnetic metals from a mixture of comminuted metallic scrap of approximately uniform particle size comprising a first container for heated bath fluid, means from introducing the mixture into the container and into contact with the bath fluid, a screw conveyor for withdrawing from the bath fluid solid mixture constituents remaining after the melting out of first selected metal from the mixture through the contact with the bath fluid, and means for recovering from the bath the melted out metal first selected for separation.

In one aspect of the invention the mixture is introduced into a bath having a temperature greater than the melting point of the metallic material to be extracted and by removal of the solid constituents remaining after the melting process by a screw conveyor. These measures make it possible to obtain a high rate of throughput, thereby enabling working on an economic basis. The process is still effective with particles of about 10 mm size and is actually superior in comparison to other processes. The screw conveyor aids particularly in the reliable removal of very small particles from the hot bath because it apparently enchances the mixing effect. Thus, droplets of molten metals, separated through the selective use of heat, are removed from the surfaces of the solid constituents of the mixture. Furthermore it is possible to so arrange a screw conveyor that molten and separated metal do not remain in contact with the solid constituents of the mixture, a fact which increases the efficiency of extraction.

In accordance with one embodiment of the process of the invention a bath is employed consisting of an oil that may be heated above the melting point of lead (327° C.) and is used to melt lead out of a mixture of comminuted metallic scrap. The oil aids the mixing activity of the screw conveyor in that it prevents droplets of separated molten metal from adhering to the remaining solid constituents of the mixture.

Another advantageous embodiment of the process of the invention involves the use of a bath consisting of a salt melt that may be heated above the melting point of zinc (419° C.), for the melting out of zinc from a mixture of comminuted metallic scrap. The use of such a high-boiling salt melt allows not only the melting of lead but also zinc by the aid of a heated bath.

The use of an oil, heatable to a high temperature as well as of a salt-melt, enables a very good separation of the individual constituents of the mixture. In such a process, of course, not only is the separation step of importance, whereby each metal is melted off the solid ingredients of the mixture, but it is also important to be able to separate the fluid of the heat bath from the metal melt obtained. That is preferably achieved by collection of the metal melt at the bottom of the bath due to its higher specific gravity.

Since the question of cost is very important, it is very advantageous that the last step of the process, i.e. the separation of metal melt from the bath fluid is as simple as possible or may be eliminated altogether. For this purpose an additional embodiment of the invention provides that the hot bath consists of a melt of the metal to be extracted. In order to start up the process a melt of the chosen metal, for example aluminum or zinc, is first prepared by heating. The melt will be heated advantageously to a higher temperature than the melting point proper because the melt will be losing some of its heat content when cold mixture ingredients are added to it. In order to reduce this caloric loss the mixture of metallic material from which one or more selected metals are to be extracted is introduced in a preheated state. In order to effect the selective melting of a particular metal, lead for example, the temperature of the melt should not be too high. It must be clearly below the melting point of the metal having the next lowest melting point, for instance zinc. As the process continues the fluid of the bath increases by the addition of molten metal melted from the solid components of the mix. An overflow control element such as a notch or similar technically simple device can be used to maintain the surface level of the bath constant so that the melt obtained may be kept and cooled in desired forms so that reasonably pure metal may be obtained. Instead of overflow means it is, of course, within the contemplation of the invention to discharge the melt in bathces in order to fill, for example, a cooling form batchwise.

It is advantageous to use an atomizing oil burner because such a device delivers the needed temperatures at the lowest cost. It is of course, also within the ambit of the invention to utilize other heating means, electrical for instance. Gas combusting devices should also be considered.

It is particularly advantageous to perform the process so as to sequentially extract two or more metals. This is performed as follows: the non-ferromagnetic metallic mixture is fed by a conveying mechanism to a hot oil bath where the lead melts out. A screw conveyor removes the remaining solid mixture from the oil bath and transports it into a salt melt bath where the zinc melts out. Another screw conveyor removes the solid residues and transports them through a heat zone for the melting out of aluminum. The melting out of lead and zinc in fluid baths is followed by the melting out of aluminum by the direct influence of heat. This is in contrast to known methods which produced environmental pollution because lead, which generated volatile oxides while being burned is extracted by a melting process which does not impair the environment. Lead, zinc and aluminum are thus obtained in pure form and an end product is recovered containing about 80% copper, a degree of rather considerable purity considering the starting material which was heretofore considered to be of little value. The process is conducted at relatively high throughput rates.

When a melt of the selected metal is used as the heat bath, it is practical to provide for a multistep process in such a manner that the initial non-ferromagnetic metallic mixture is fed by transporting means to a bath consisting of molten lead that lead is melted out therein, that sequentially the remaining mixture of solids is removed from the lead bath by a screw conveyor and is fed to a zinc bath, that the zinc is melted out therein and the remaining mixture of solids is removed therefrom by another screw conveyor and is conducted through a heated zone in order to melt aluminum therefrom.

The invention is also directed towards apparatus for carrying out the method, the apparatus consisting of a feeding device, a screw conveyor for removal of non-melted solids and a container for holding the bath fluid.

In a further embodiment of the invention the feeding means includes a shaking device. This shanking device may, for instance, be connected to an inclined feeding channel connecting a supply bin to the heat bath. The regulation of frequency and amplitude of the shaking means are adapted to establish the throughput of the mixture to be transported. Furthermore the shaking motion can also be transferred to the screw conveyor means so that the vibrations facilitate the loosening of the metal drops which were precipitated by the mixing motions of the screw conveyor.

Preferably, the feeding means delivers the initial metallic mixture to a pipe which is closed at its end. The pipe terminates in the bath fluid and is provided with holes communicating with the bath fluid. The solids mixture moves through this pipe, which pipe inclines obliquely into the fluid, into the heated bath either by itself or aided by the shaking motions. The melting process takes place here. The closure of the pipe at one end prevents the mixture from entering the container containing the heated bath but guarantees by means of its apertures that the same fluid level exists within the pipe as exists outside the pipe.

It is particularly advantageous when the feed pipe is furnished on its outer surface with a screw conveyor which rotates within an external pipe that is in turn provided with an end closure having apertures for the admission of the bath fluid into the external pipe. In such embodiment the screw conveyor is particularly economical in relation to space and material because it is combined with the feeding device. Due to the apertures the level of the bath inside the external pipe is identical with the level of the bath externally thereof. It is advantageous that the feed pipe terminate prior to the last screw winding and be provided at such location with outlet apertures. Thus the mixture moves from the internal pipe into the external pipe while it is inclined within the bath fluid. This construction of the outlet for the mixture ensures that all solid parts of the mixture are removed from the bath fluid without coming into contact with the metal melt which collects at the lower end within the external pipe. It is also preferred that the screw conveyor be enclosed with little play by the external pipe. In this manner the solid ingredients of the mixture are positively removed from the bath while it is possible for any metal which melts off the solids due to the mixing motion of the screw to run downwards to the end of the external pipe. It is also within the scope of the invention that the screw conveyor be encircled by the external pipe so as to provide only as much play so that it may rotate easily, the outer edges of the screw conveyor being provided with a plurality of recesses. Free backstreaming of the fluid metal is thus made possible and the risk of solid particles of the mixture being pinched between the external pipe and the screw conveyor is also obviated.

Advantageously an outlet for the melted-out metal is provided within the lowermost end area of the external pipe thereby allowing the bleeding off of metal melt collecting therein. It is advantageous to make the outlet or its extension capable of being selectively opened or closed so that the metal can be bled off only after reaching a certain level, thus being practically free of any bath fluid due to its higher density. The capability of selective opening and closing of the outlet enables formation of the discharged molten metal into ingots.

The heating bath is subject to certain specifications due to the high temperature to which it is subjected. In order to render lead (Melting point 327° C.,) an oilheating-bath comprising an oil containing benzenesulphonate groups, preferably Marlotherm-oil is recommended. Despite the use of such a heat resisting oil a large part of the oil evaporates due to the high working temperatures. Therefore a condenser for the evaporated oil is desirably provided as well as a return pipe closing the circular flow and a line for feeding evaporated bath material to the burner. By this method not only is the pollution of the environment by oil vapors substantially prevented but it is also possible to reuse more of the expensive oil, if desired with the addition of a pump.

It is also advantageous to utilize a preheating zone for the initially introduced mixture heated by the hot burner exhaust gases arranged in the area of the feed device. Thus, the heat energy is more efficiently utilized because such preheating minimizes a cooling down of the bath. Furthermore, water which sometimes adheres to the metallic mixture from previous processes is removed.

It has also been found to be advantageous to employ a feed device which includes a screw conveyor. This avoids the need for inclining the feed conveyor paths. A reliable and steady transport of feed material is still obtained. The arrangement may be set up in such a manner that the feed screw is concentric relative to a solids discharge screw, both preferably being driven by a common engine. This embodiment affords a compact space-saving construction, which is particularly advantageous because the space to be heated is comparatively small.

According to another preferred form of the invention, a feed pipe is provided with an entrance aperture for the admission of the metallic mixture and an outlet aperture arranged on its underside for discharging the mixture into the bath fluid, the feed pipe being adapted to receive a first conveyor screw therein; a second external screw conveyor being provided for continued movement of the mixture within the bath, said second screw conveyor dipping at least partly into the bath and being arranged on the external side of the feed pipe; a discharge device such as a scoop or shovel for transferring the material from the bath into the interior of an extension of the feed pipe, and a third screw conveyor positioned within the extension of the feedpipe in order to transport the material further along. Thus, the material is brought into the bath vat by the first screw, falls after passing the first turn of the external (second) screw into the bath fluid, is moved along therein by the external (second) screw while the bath is mixed thoroughly so that the bath fluid may react with all surfaces of the mixture constituents, and is finally lifted to the original conveying plane by the discharge device and out of the hot bath vat.

The aforementioned discharge device preferably comprises at least one shovel fastened to the extension of the feed pipe and extending lengthwise thereof. An aperture is formed in the feed pipe extension above the shovel when viewed endwise in the direction of feed pipe rotation. The downstream end of the bath, in the vicinity of said aperture, contains accumulated mixtures which are picked up by this shovel, of which of course there may be more than one, lifted from the bottom of the bath vat or enclosure and are, after 90° rotation of the feed pipe extension, removed through the aperture into the interior of the feed pipe extension where they are conveyed by the screw therein. Advantageously apertures are provided in and at the last screw turn of the external screw conveyor before the rear end wall of the bath vat. Shovel projections are also arranged to extend in a slanted manner towards the plane of the screw turns. This serves to prevent material from accumulating at this end wall when the discharge device has failed to move all of the material into the interior of the feed pipe extension. The material thus enters the aperture and falls upon the shovel of the discharge device or into the working space of the shovel and is removed from the bath.

It is advantageous to arrange the heating burner for the hot bath in such a manner that a heating zone is formed in the area of the extension of the feed pipe which extends out of the hot bath, the temperature of such heating zone being higher than that of the hot bath. This higher temperature serves to melt out higher melting metals such as aluminum. As mentioned earlier, melting by direct heat is only free of risk when the poisonous oxides-forming metals have already been removed. Since the heating of the hot bath for the melting of a high melting point material such as zinc requires a burner whose flame temperature is above the desired bath temperature, it as advantageous to also use this burner for the melting of the still higher melting aluminum (melting point 659° C.). In this manner only negligible amounts of additional energy are needed and aluminum can thus be obtained and concommitantly the degree of purity of the recovered copper rises. Outlet apertures are arranged at the bottom of the feed pipe extension and are covered by sieves. The sieves prevent the escape of copper-containing mixture ingredients which remain solid due to the higher melting point of copper (1083° C.) but allow the aluminum to run out.

For the melting out of zinc, particularly, a hot bath is practical which consists of zinc chloride ($ZnCl_2$). Zinc chloride has a melting point of 365° C. and a boiling point of 732° C. It is thus very capable of being used for the melting out of zinc which melts at 419° C. without having to operate close to the boiling point. Furthermore, zinc chloride is not reactive chemically with the material of the container, a property which is very advantageous for protracted use of the device. It is, of course, within the scope of the invention to use a melt consisting of the metal to be melted out as a bath fluid.

In order to recover metal which settles to the bottom of the bath container due to its higher density, an outlet aperture is desirably provided in the area of the bottom of the container which outlet may be kept open or shut. Such control of the outlet enables the user to wait until sufficient melt has accumulated at the bottom of the container before withdrawing the melt or, alternatively, to maintain a continuous discharge so as to maintain the level of the melted-out metal constant.

Additional objects and advantages of the present invention will become readily apparent to persons skilled in the art from the ensuing description.

BRIEF DESCRIPTION OF THE DRAWINGS

In order that the invention may be more fully comprehended, it will now be described, by way of example, with reference to the accompanying drawings in which.

DESCRIPTION OF THE PREFERRED EMBODIMENTS

Figure 1:
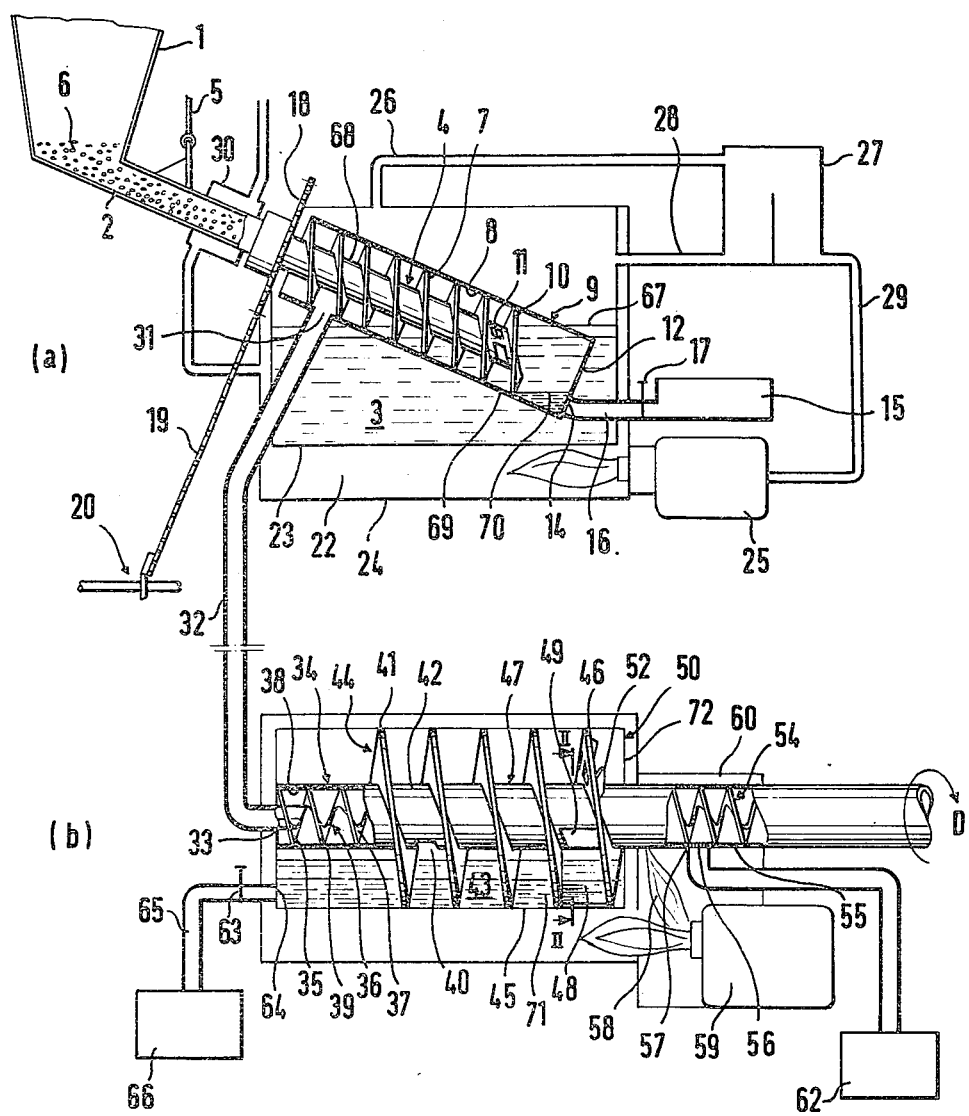
FIGS. 1a and 1b are schematic representations of two different aspects of apparatus for carrying out the invention.
Figure 2:
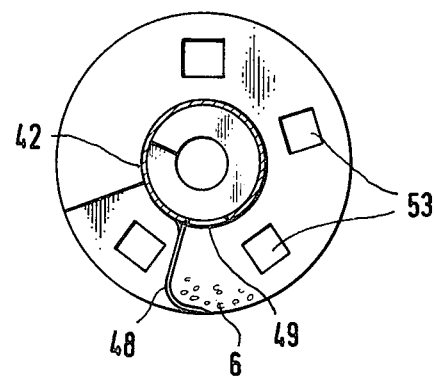
FIG. 2 is an end view, partially in cross section, taken along line II—II of FIG. 1b.
Figure 3:
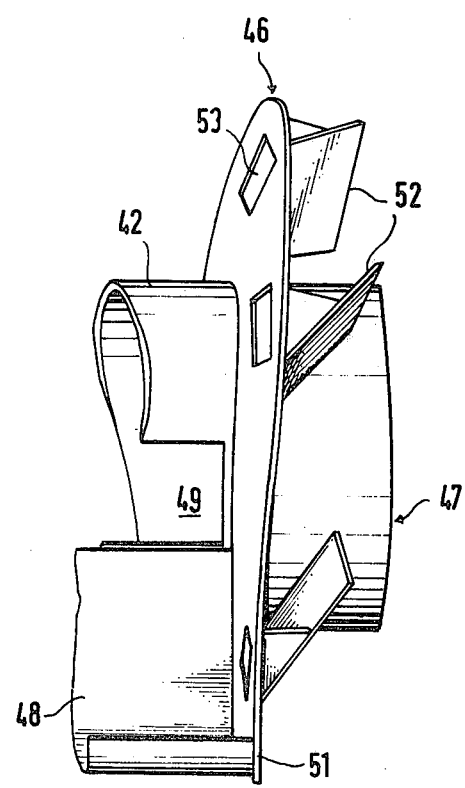
FIG. 3 is an enlarged fragmentary perspective view of the last turn of the external screw and feed pipe shown in FIG. 1b.

The embodiment of the device according to the invention, as shown in FIG. 1a is preferably used to melt out lead, and the embodiment shown in FIG. 1b is particularly useful for the melting out of zinc, in which case the device of FIG. 1b is operatively connected sequentially with the device of FIG. 1a.

Referring to FIG. 1a, there is shown a storage container or feed hopper communicating with a feed channel 2 which terminates in a feed pipe 4 that inclines downwardly into bath fluid 3 contained in a vat or container 21. The feed channel 2 is connected to a shaker device 5 (depicted only representationally) which imparts a vibratory motion thereto so as to insure the forward movement of the mixture of metallic particles 6 reposing in the storage container 1.

The inclined pipe 4 carries a screw conveyor 7 which is fitted rotatably within a coaxially extending external pipe 9. The outer periphery of the screw conveyor is spaced slightly from the inner wall 8 of pipe 9. Apertures 11 are formed in pipe 4 adjacent its closed end, such apertures being located upwardly of the last screw blade or turn 10.

The outer pipe 9 is also closed at its lower end and is provided with apertures 12 for admission of the bath fluid. At the lowest point of an end wall or closure 13 for the outer pipe 9, and outlet 14 is formed connected to a conduit 16 which leads to a storage container 15. A closure device 17 such as a valve or gate is arranged between the outlet 14 and the storage container 15 to provide selective control of the discharge of molten metal from the lower end of pipe 9 as will become clear.

The screw conveyor 7 is driven by the inner pipe 4; a drive chain 19 being provided for meshing engagement with a large cogwheel 18 operatively connected to or carried by feed pipe 4. The rest of the driving mechanism 20 is shown schematically only.

As stated earlier, the bath fluid 3 rests in a container 21 which is of double wall construction, the walls being preferentially fabricated from a fireproof clay. The space 22 between the inner wall 23 and the outer wall 24 of the container is heated by means of an atomizing oil burner 25.

Heating oil vapors from bath 3 are evacuated through a conduit 26 and are conveyed to a condenser 27 where they are condensed and recycled to the bath by conduit 28. The remaining bath-vapors are used as combustion air and are conducted to the burner 25 by means of conduit 29. The combusted gases in interspace 22 are led into a preheating zone 30, disposed in the area of the feed channel 2, and are then discharged into a smoke stack (not shown).

In the upper end—the solids outlet side—of the external pipe 9 there is formed an outlet aperture 31 to which is connected a conduit 32. The solids withdrawn from outlet 31 can, if it is desired to recover higher melting metal components, can be further processed in the apparatus shown in FIG. 1b. Thus, the device shown in FIG. 1b can serve to perform additional steps such as the melting out of zinc and aluminum.

Conduit 32 extends to an entrance aperture 33 of a feed pipe 34 and communicates therewith at a location upstream of the first turn or blade 35 of a screw conveyor 36 which is disposed within the feed pipe 34. The blades of screw conveyor 36 may be connected to the inner surface 38 of the feed pipe 34 and are, therefore, driven by the feed pipe. The area of the first screw turns 35, 39, 37 serve a preheating zone. After a few screw turns such as 35, 39, 37 the feed pipe 34 is closed at its front side and is provided with an outlet aperture 40 for the discharge of the remaining solids of mixture 6. This outlet aperture 40 is arranged downstream of the first turn or blade 41 of a screw conveyor 44 which is mounted on the outer surface 42 of the feed pipe 34, the blades of the screw conveyor 44 being of sufficient diameter so that they dip into the salt bath 43.

The dimensions of the blades of external screw conveyor 44 are such that their outer peripheries reach approximately to the bath bottom 45 and thereby allow further transport of the material resting therein. A discharge device is provided ahead of the last screw turn or blade 46 of the external screw 44.

The discharge device in the embodiment shown consists of at least one scoop or shovel 48, fastened to an extension 47 of the feed pipe 34. Such scoops or shovels extend lengthwise and parallel to the longitudinal axis of the feed pipe 34 and project outwardly at the lower extremity in the direction D of rotation of the feed pipe. It also contains, when viewed in the direction D of rotation in front of shovel 48 an aperture 49 formed in the extension 47 of the feed pipe 34. In order to avoid backing up of material of the mixture not scooped up by the shovel at the end wall 72 of the bath container 50 several shovel ears 52 are provided on the last screw turn or blade 46 of the external screw 44. These shovel ears 52 project towards the end wall 72 of the bath container 50 and are disposed angularly relative to the surface of the screw blade. Furthermore, when viewed in the direction of rotation D an aperture 53 is provided in front of each shovel ear 52. The shovel ears 52 thus accept portions of the mixture 6 which arrive in the area of the end wall 72 and transport them back into the space immediately upstream of last turn or blade 46 when the external screw rotates further in the direction D.

The aperture 49 of the extension 47 of the feed pipe 34 is disposed upstream of the first turn or blade of a screw 54 which is disposed interiorly of the extension 47 of the feed pipe 34. The screw 54 is desirably an extension of the screw 36 which is disposed at the entrance of the feed pipe 34. An aperture 57, provided with a sieve 56, is formed in the bottom of extension 47 along the transport path of interior screw 54 exteriorly of the bath container 50. This area of the extension 47 of the feed pipe 34 is heated directly by the flames 58 of the burner 59 which is arranged to also heat the bath. Such area of extension 47 is thus heated to an appropriately high temperature. This area also lies, as does the bath container 50, inside an outer firebrick wall. The interior screw 54 extends into a discharge aperture (not shown) for the withdrawal of the remaining solids of mixture 6.

The outlet aperture 57, covered by sieve 56, is connected by means of a pipe line 61 with a container 62 for aluminum which has been melted out. An outlet 64 is provided in the bottom area of the bath container 50 and there is provided a valve or gate mechanism 63. The outlet 64 is connected by pipe line 65 to a container 66 for the separated zinc.

When the apparatus shown in FIG. 1a and 1b are coupled the process is conducted as follows:

A mixture 6, consisting for example of non-ferromagnetic particles having an average particle size of approximately 10 mm of copper, lead, zinc, aluminum and copper plus zinc, is fed into the area of the preheating zone 30 and slides downwardly along the feed channel 2 due to its inclined disposition aided by the vibratory effect of the shaking device 5. The mixture 6 is preheated and dried with the aid of the hot burner combusted gases. The mixture reaches the bath fluid 3 through the internal pipe 4 which descends into the surface of the fluid bath. The level 67 of the bath 3 is sufficiently high that the mixture 6 is enclosed by the bath fluid 3 within the interior of the pipe 4. The hot oil of the bath melts out lead contained in the mixture 6. The remaining solid constituents of the mixture fall through the apertures 11 of the pipe 4 and are well mixed and transported upwards along the bottom 69 of the external pipe 9 within the bath 3. Simultaneously, lead which was not completely melted is now completely removed from the surfaces of the solids of mixture 6 and collects on the bottom of pipe 9. As soon as the level 70 of the molten lead reaches a certain height the valve mechanism 17 is opened and lead is permitted to flow into and fill the container 15.

The remaining mixture ingredients 6 are transported upwards by the screw-conveyor 7 and are discharged from pipe 9 by means of outlet aperture 31. Such mixture constituents are conveyed by conduit 32 to the subsequent steps of the process to be performed in the apparatus shown in FIG. 1b.

The constituents of the mixture 6 enter the entrance aperture 33 at the upstream or inlet end of the feed pipe 34 and are deposited immediately downstream or ahead of turn or blade 35 of screw 36 disposed inside the feed pipe 34. Through the exit or discharge aperture 40 in the feed pipe 34 they fall in front of the first turn or blade 41 of the exterior screw 44 into the bath fluid 43 which consists of a melt of zinc chloride. The exterior screw 44 moves the constituents of mixture 6, again mixing them thoroughly, within the bath fluid 43 thereby quantitatively melting the zinc component in mixture 6. The liquid zinc 71 collects at the bottom 45 of the bath container 50 and may be withdrawn therefrom and conducted into collecting container 66 by opening the valve mechanism 63 once the liquid zinc within bath container 50 has reached a certain level.

The remaining ingredients of the mixture 6, now consisting mainly of copper and aluminum, progess to the end of the bath container 50 adjacent the shovelling area of the shovel 48. Such ingredients are lifted by the shovel 48 and, upon further rotation of the feed pipe 34, are returned to the interior of the extension 47 of feed pipe 34 through the aperture 49 of the extension 47. They are deposited in front of the first screw turn or blade of the interior screw conveyor 54 and are transported by the screw conveyor 54 out of the interior space of the bath container 50. The ingredients reach a zone of still higher temperature produced by direct radiation from the burner flame 58. Here the melting temperature of aluminum is reached so that aluminum melts out, passes through the sieve 56-covered aperture 57 and is conducted by means of conduit 61 to collecting container 62. The still remaining solid ingredients of the mixture consist now of approximately 80% copper and are withdrawn to a collecting container (not shown) at the end of the extension 47 of the feed pipe 34. The valuable material, obtained there, may then be further processed as desired.

The invention is not restricted to the embodiments described. For example, it is not necessary to use an oil bath, it could be replaced by a melt bath of the individual metal which has been selected for extraction. Indeed deplacement of the oil bath with a bath of the metal selected for extraction may be advantageous in certain instances.

What is claimed is:

1. Apparatus for the selective separation of nonferromagnetic metals from a mixture of comminuted metallic scrap of approximately uniform particle size comprising a first container for heated bath fluid, means for introducing said mixture into said container and into contact with the bath fluid, said introducing means comprising a feed channel connected at one end thereof to a source of supply of said mixture and at the other end thereof to a first pipe closed at the end thereof remote from its connection to said feed channel, said first pipe having at least one aperture therein adjacent the closed end thereof, said first pipe being positioned so as to extend into said container and allow the admission of bath fluid thereto through said at least one aperture, a screw conveyor for withdrawing from the bath fluid solid mixture constituents remaining after the melting out of a first selected metal from said mixture through said contact with the bath fluid, and means for recovering from said bath the melted out metal first selected for separation.

2. Apparatus according to claim 1, wherein said first pipe is positioned to extend downwardly at an angle into said container such that said closed end thereof and said at least one aperture is disposed below the surface of bath fluid within the container.

3. Apparatus according to claim 2, wherein an outer pipe is concentrically positioned about said first pipe and is provided with a closed end submerged within said container beneath the surface of both fluid therein, the closed end of said outer pipe having at least one aperture therein for admission of bath fluid into said outer pipe, and said screw conveyor being mounted on the external surface of said first pipe for rotation within said outer pipe.

4. Apparatus according to claim 1, 2 or 3, wherein means are provided for vibrating said feed channel to advance said mixture into said first pipe.

5. Apparatus according to claim 3, wherein said screw conveyor comprises a flight of blades and said first pipe terminates between the two screw conveyor blades most remote from said feed channel, said at least one aperture of said first pipe being located between said two screw conveyor blades.

6. Apparatus according to claim 5, wherein said screw conveyor blades terminate at their outer peripheries closely adjacent the inner surface of said outer pipe.

7. Apparatus according to claim 6, wherein said screw conveyor blades are dimensioned radially to terminate in such close proximity to the inner surface of said outer pipe as to only insure rotation of the screw conveyor within said outer pipe, the outer peripheral edges of said blades being provided with recesses therein.

8. Apparatus according to claim 3, wherein a discharge outlet is formed in the lower end region of said outer pipe for selective removal of molten metal.

9. Apparatus according to claim 8, wherein valve means is provided for selectively controlling the flow of molten metal from said discharge outlet.

10. Apparatus for the selective separation of nonferromagnetic metals from a mixture of comminuted metallic scrap of approximately uniform particle size, comprising a first container for heated bath fluid, at least the bottom wall of said container being of a double-wall construction, burner means positioned so as to discharge a heating flame within said bottom wall of said container, a condenser, first conduit means for withdrawing vaporized bath fluid from said container and for conducting said vaporized bath fluid to said condenser, said condenser condensing said vaporized bath fluid, second conduit means for returning condensed bath fluid to said container, a screw conveyor for withdrawing from the bath fluid solid mixture constituents remaining after the melting out of a first selected metal from said mixture through said contact with the bath fluid, and means for recovering from said bath the melted out metal first selected for separation.

11. Apparatus according to claim 10, wherein additional conduit means are provided for conveying said vaporized bath fluid to said burner means as combustion gas.

12. Apparatus for the selective separation of nonferromagnetic metals from a mixture of comminuted metallic scrap of approximately uniform particle size comprising a first container for heated bath fluid, at least the bottom wall of said container being of a double-wall construction, burner means positioned so as to discharge a heating flame within said bottom wall of said container, means for introducing said mixture into said container and into contact with the bath fluid, a preheating zone in heat exchange relationship with said mixture introducing means, conduit means for conveying combustion gases from the region of said bottom wall of said container to said preheating zone, a screw conveyor for withdrawing from the bath fluid solid mixture constituents remaining after the melting out of a first selected metal from said mixture through said contact with the bath fluid, and means for recovering from said bath the melted out metal first selected for separation.

13. Apparatus for the selective separation of nonferromagnetic metals from a mixture of comminuted metallic scrap of approximately uniform particle size comprising a first container for heated bath fluid, means comprising a first feed pipe for introducing said mixture into said first container and into contact with the bath fluid, a first screw conveyor for withdrawing from the bath fluid solid mixture constituents remaining after the melting out of a first selected metal from said mixture through said contact with the bath fluid, means for recovering from said bath the melted out metal first selected for separation, a second container for heated bath fluid, a second feed pipe positioned within said second container, a second screw conveyor rotatably mounted within said second feed pipe, said second feed pipe being adapted to receive solid mixture constituents withdrawn from the bath fluids of said first container, an aperture in said second feed pipe for delivering said solid mixture constituents to the bath fluid in said second container, a third screw conveyor carried by said second feed pipe for rotation therewith, the blades of said third screw conveyor being dimensioned to extend into the bath fluid within said second container for moving said solid mixture constituents therewithin, means for heating the bath fluid within said second container to a temperature above the melting point of a selected second metal of said mixture to melt said second selected metal therefrom, means for scooping up solid mixture constituents remaining after the melting out of said second selected metal and for transferring such remaining solid mixture constituents to the interior of said second feed pipe within said second container, and additional screw conveyor means for moving said remaining solid mixture constituents within said second feed pipe to a location outside of said second container.

14. Apparatus according to claim 13, wherein the portion of said second feed pipe located outside said second container comprises an extension thereof and said additional screw conveyor means is mounted within said second feed pipe extension.

15. Apparatus according to claim 13, wherein said means for scooping up and transferring said remaining solid mixture constituents comprises at least one shovel carried by and extending lengthwise of said second feed pipe in parallel relation thereto, and aperture being formed in advance of said shovel in said second feed pipe in the direction of rotation thereof, said shovel having the extremity thereof remote from said aperture directed outwardly to form a channel for holding the solid mixture constituents for transfer through said aperture into the interior of the second feed pipe.

16. Apparatus according to claim 15, wherein the blade of said second screw conveyor located furthermost downstream within said second container and closest to the adjacent end wall of said second container is provided with at least one aperture therein, an ear-like element being provided on said blade of the second screw conveyor extending angularly therefrom in the vicinity of each aperture therein for scooping accumulated solid mixture material within said second container in front of said blade and for transferring such solid mixture material through the apertures of said blade onto said shovel.

17. Apparatus according to claim 14, wherein said means for heating the bath fluid in said second container is so positioned as to heat a portion of said second feed pipe extension to thereby establish a heating zone therein in which a temperature is maintained that is higher than the melting point of a selected metal in said remaining solid mixture constituents after the melting out of said second selected metal.

18. Apparatus according to claim 17, wherein at least one aperture is provided in said second feed pipe extension for withdrawal of molten metal therefrom.

19. Apparatus according to claim 18, wherein a sieve is positioned over each of said apertures in said second feed pipe extension.

20. Apparatus according to claim 13, wherein outlet means are provided for selectively withdrawing molten second selected metal from the lower regional of said second container, valve means being provided in association operatively with said outlet means whereby the flow of molten metal can be selectively controlled.

* * * * *